(12) United States Patent
Corral

(10) Patent No.: US 6,837,481 B1
(45) Date of Patent: Jan. 4, 2005

(54) EMERGENCY MULTI-PURPOSE VALVE EXTENSION (EMV EXTENTION)

(76) Inventor: Felipe Corral, 1931 Santa Lucia Ave., Oxnard, CA (US) 93030

( * ) Notice: Subject to any disclaimer, the term of this patent is extended or adjusted under 35 U.S.C. 154(b) by 0 days.

(21) Appl. No.: 10/383,918

(22) Filed: Mar. 5, 2003

Related U.S. Application Data

(60) Provisional application No. 60/361,410, filed on Aug. 13, 2002.

(51) Int. Cl.[7] .............................................. F16K 31/00
(52) U.S. Cl. .......................................... 251/293; 4/661
(58) Field of Search .............................. 251/293; 4/661

(56) References Cited

U.S. PATENT DOCUMENTS

| | | | | |
|---|---|---|---|---|
| 702,342 A | * | 6/1902 | Clough | 251/293 |
| 1,995,174 A | * | 3/1935 | Gerrard et al. | 251/293 |
| 3,598,361 A | * | 8/1971 | Crowe | 251/293 |
| 4,266,320 A | * | 5/1981 | Grant | 251/293 |
| 5,282,280 A | | 2/1994 | Wodeslavsky | |
| 5,524,299 A | | 6/1996 | Dalfino | |
| 5,711,511 A | * | 1/1998 | Cynar | 251/293 |
| 6,047,725 A | | 4/2000 | Gish | |
| 6,178,981 B1 | * | 1/2001 | Wales | 251/293 |

* cited by examiner

*Primary Examiner*—John Bastianelli
(74) *Attorney, Agent, or Firm*—Richard S. Erbe

(57) ABSTRACT

A control apparatus for use with utility control valves is disclosed. The control apparatus would be an extension attached to the utility control valve in a variety of applications, such as the water shutoff valve in a toilet, sink, or water heater. The extension would make it much easier for a user to turn on and off the water supply to a particular item in a quick fashion, or alternatively, make is much easier for disabled or elderly people to turn off the water supply if the need may arise. Alternatively, the utility control valve could also be a gas valve or another type of utility control valve.

6 Claims, 3 Drawing Sheets

EMERGENCY MULTI-PURPOSE VALVE EXTENSION (EMV EXTENTION)

This application claims the benefit of prov. application 60/361,410 filed on Aug. 13, 2002.

I. BACKGROUND OF THE INVENTION

The present invention concerns that of a new and improved control apparatus for use with utility control valves in a residence or structure.

II. DESCRIPTION OF THE PRIOR ART patent U.S. Pat. No. 6,047,725, issued to Gish, discloses a valve for controlling the water level in a toilet tank.

U.S. Pat. No. 5,524,299, issued to Dalfino, discloses a shutoff device for an inlet valve preventing leaks and overflowing water from a toilet tank.

U.S. Pat. No. 5,282,280, issued to Wodeslavsky, discloses an inlet and outlet control valve for a toilet.

III. SUMMARY OF THE INVENTION

The present invention concerns that of a new and improved control apparatus for use with utility control valves. The control apparatus would be an extension attached to the utility control valve in a variety of applications, such as the water shutoff valve in a toilet, sink, or water heater. The extension would make it much easier for a user to turn on and off the water supply to a particular item in a quick fashion, or alternatively, make is much easier for disabled or elderly people to turn off the water supply if the need may arise. Alternatively, the utility control valve could also be a gas valve or another type of utility control valve.

There has thus been outlined, rather broadly, the more important features of a control apparatus for use with utility control valves that the detailed description thereof that follows may be better understood and in order that the present contribution to the art may be better appreciated. There are, of course, additional features of the control apparatus for use with utility control valves that will be described hereinafter and which will form the subject matter of the claims appended hereto.

In this respect, before explaining at least one embodiment of the control apparatus for use with utility control valves in detail, it is to be understood that the control apparatus for use with utility control valves is not limited in its application to the details of construction and to the arrangements of the components set forth in the following description or illustrated in the drawings. The control apparatus for use with utility control valves is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, Upon which this disclosure is based, may readily be utilized as a basis for the designing of other structures, methods and systems for carrying out the several purposes of the present control apparatus for use with utility control valves. It is important, therefore, that the claims be regarded as including such equivalent constructions insofar as they do not depart from the spirit and scope of the present invention.

It is therefore an object of the present invention to provide a control apparatus for use with utility control valves which has all of the advantages of the prior art and none of the disadvantages.

It is another object of the present invention to provide a control apparatus for use with utility control valves which may be easily and efficiently manufactured and marketed.

It is another object of the present invention to provide a control apparatus for use with utility control valves which is of durable and reliable construction.

It is yet another object of the present invention to provide a control apparatus for use with utility control valves which is economically affordable and available for relevant market segment of the purchasing public.

Other objects, features and advantages of the present invention will become more readily apparent from the following detailed description of the preferred embodiment when considered with the attached drawings and appended claims.

IV. BRIEF DESCRIPTION OF THE DRAWINGS

FIG. 1 perspective view of the present invention in use with a toilet.

V. DESCRIPTION OF THE PREFERRED EMBODIMENT

Priority is hereby claimed to application 60/361,410, filed on Mar. 5, 2002.

Figure 1:
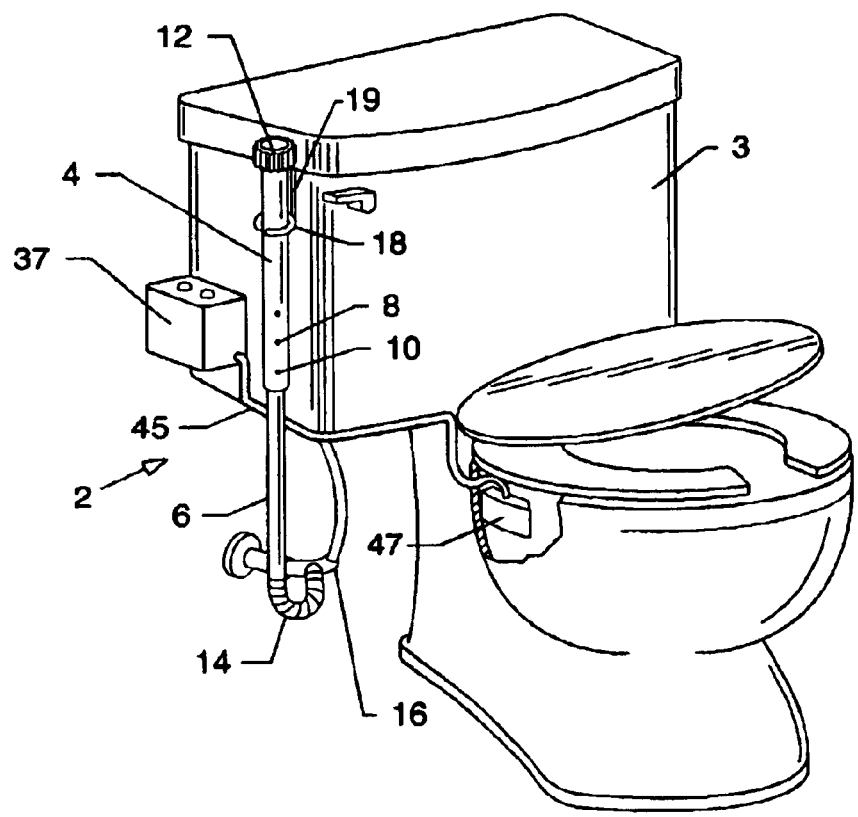

FIG. 1 shows a perspective view of the present invention in use with a toilet 3., while FIG. 1A shows a close-up side view of the present invention. Extension 2 comprises outer shaft 4 and inner shaft 6, which each have two ends, a first end and a second end. Outer shaft 4 and inner shaft 6 are each cylindrical and hollow, with the first end of inner shaft 6 being slidably inserted into the second end of outer shaft 4. Outer shaft 4 has a plurality of holes 8 evenly spaced out in a row and inner shaft has a button 10 mounted on spring 11 that can be used to temporarily fix the position of outer shaft 4 relative to inner shaft 6.

The first end of outer shaft 4 would have a knob 12 that would be connected to a valve controlling water flow via a pin 50 and a pair of holes 52 and 54 near the first end of outer shaft 4. When inner shaft 6 is fully extended outside of outer shaft 4, extension 2 is about 30 to 36 inches in length.

In the embodiment shown in FIG. 1a, the second end of inner shaft 6 has a tip coupling 56. Flexed coil extension 14 has two ends, a first end and a second end, with the first end of flexed coil extension having a female insert 58 which connects to tip coupling 56 on the second end of inner shaft 6. The second end of flexed coil extension 14 connects to a water control valve 16 located immediately behind a toilet. By turning knob 12, an individual causes extension 2 and flexed coil extension 14 to rotate and to ultimately turn knob 12 to the right or left, as desired. This action turns the water supply to the toilet 3 on or off, depending on which way the knob 12 would be turned.

Mount 18 and hook 19 would hold outer shaft 4 to the side of a toilet tank, giving extension 2 support to stay in an upright position. Hook 19 loops over the inside of the toilet tank on the toilet, while mount 18 is merely either a cylindrical ring or loosely fit holder that allows extension 2 to rotate when knob 12 is rotated. In the absence of a hook 19, mount 18 would be attached to a fixed object.

FIG. 1 also has water level indicator 37 attached to the side of the toilet 3. Indicator 37 is connector water level sensor 47, located in the toilet bowl, by cord 45. When the water level within the toilet bowl gets too high, water level sensor 47 will indicate this and will trigger indicator 37, which will emit beeping noises.

Figure 2:
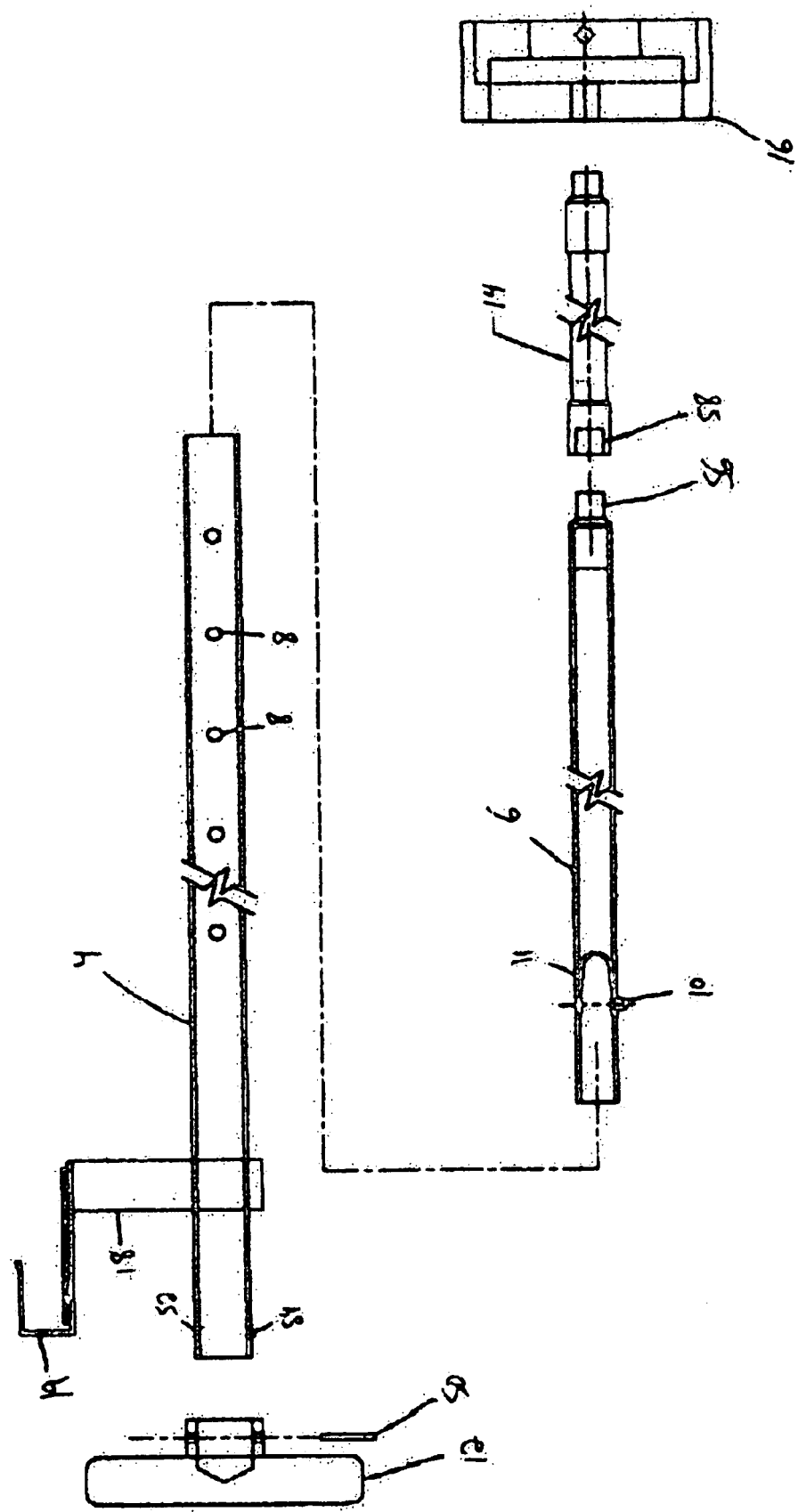
FIG. 2 shows a close-up side view of the present invention.
Figure 5:
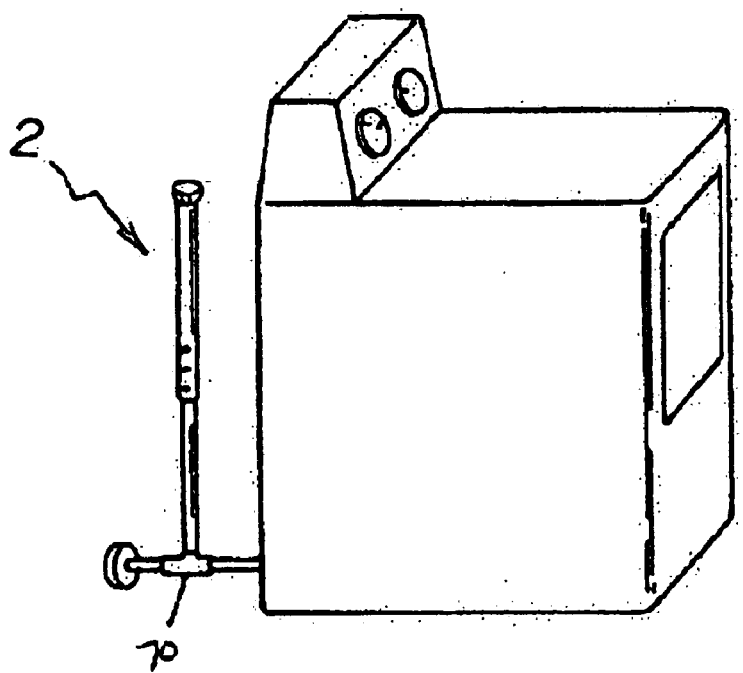
FIG. 5 shows a perspective view of the present invention in sue with a stove or gas dryer.

FIG. 2 shows a perspective view of the extension 2 in use with a sink 22. This embodiment of extension 2 would allow a user to turn on and turn off the water flow to a sink in a much easier fashion that is present in the existing art. With this embodiment, a flexed coil extension would not be needed because extension 2 would he in a "straight line" fashion with some of the existing plumbing already under the sink 22. Mount 18 holds extension 2 in place.

Figure 3:
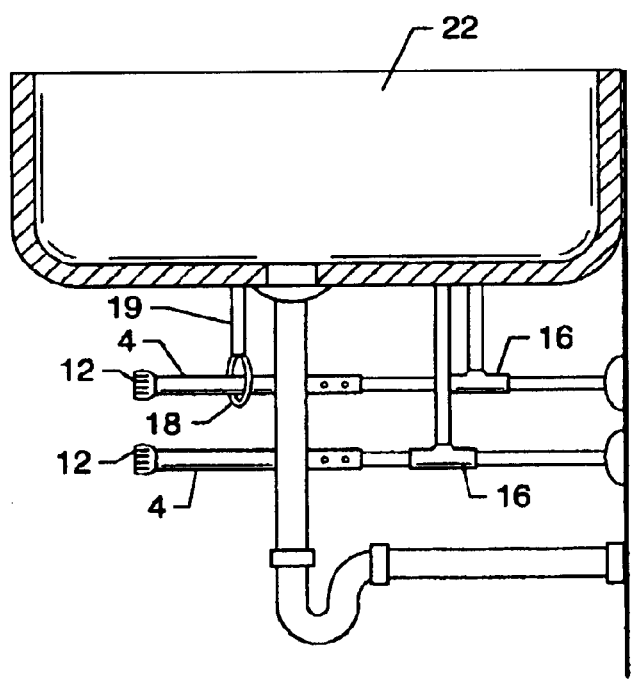
FIG. 3 shows a perspective view of the present invention in use with a sink.

FIG. 3 shows a perspective view of the extension 2 in use with a water heater 24. This embodiment would function in essentially the same way as the embodiment with the sink. With this embodiment, it would be preferably to have two extensions 2 in use, one with the hot water line and the other with the cold water line. A mount 18 holds the extension 2 in place.

Figure 4:
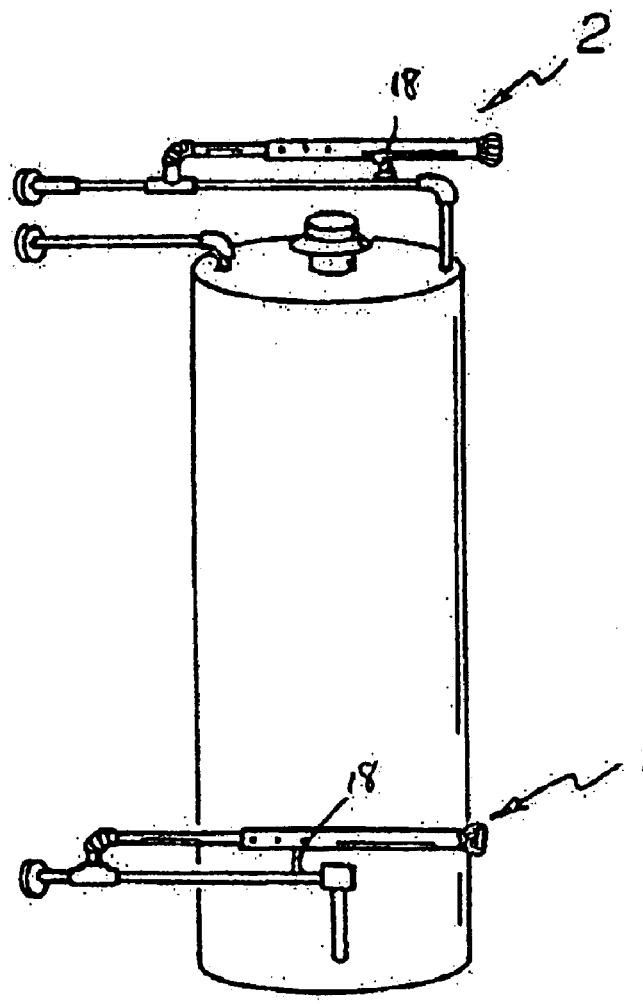
FIG. 4 shows a perspective view of the present invention in use with a water heater.

FIG. 4 shows a perspective view of the extension 2 in use with a stove or gas dryer. In this embodiment, extension 2 would be used to regulate the flow of natural gas rather than the flow of water. Valve 70 is a gas control valve rather than a water control valve.

What I claim as my invention is:

1. A control apparatus for use with utility control valves comprising:
   (a) an outer shaft having two ends, a first end and a second end, the outer shaft being hollow, the outer shaft being cylindrical,
   (b) an inner shaft having two ends, a first end and a second end, the inner shaft being hollow, the inner shaft being cylindrical, the first end of the inner shaft being insertable within the second end of the outer shaft,
   (c) a plurality of holes evenly spaced out in a row on the outer shaft,
   (d) a spring located within the inner shaft,
   (e) a button attached to the spring, the button extending outward through the inner shaft,
   (f) a knob attached to the first end of the outer shaft,
   (g) a flex coil extension having two ends, a first end and a second end, the first end of the flex coil extension attached to the second end of the inner shaft,
   (h) a utility control valve, the utility control valve connected to the second end of the flex coil extension,
   (i) means for mounting the control apparatus.

2. A control apparatus for use with utility control valves according to claim 1 wherein the utility control valve is a natural gas control valve.

3. A control apparatus for use with utility control valves according to claim 1 wherein the utility control valve is a water control valve.

4. A control apparatus for use with utility control valves according to claim 3 wherein the means for mounting the control apparatus further comprises:
   (a) a holder, and
   (b) a hook attached to the holder, the hook also attached to a fixed object.

5. A control apparatus for use with utility control valves according to claim 4 wherein the holder is a cylindrical ring.

6. A control apparatus for use with utility control valves according to claim 4 wherein the holder is a loosely fit holder.

* * * * *